(No Model.) 2 Sheets—Sheet 2.
J. NORTON, Sr.
POTATO PLANTER.
No. 327,011. Patented Sept. 29, 1885.
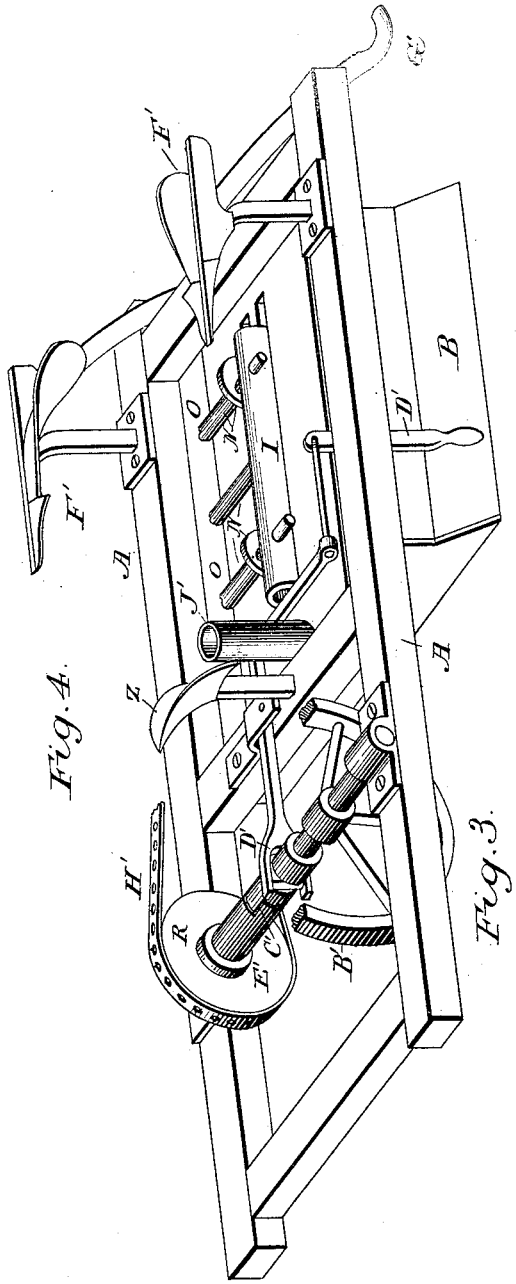
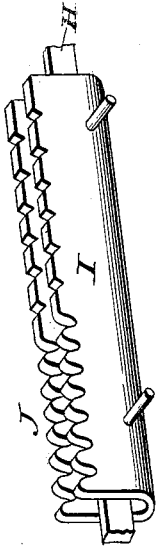
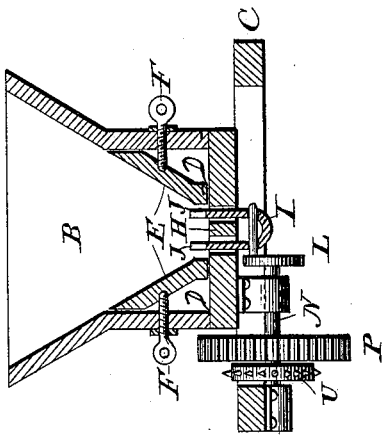
Witnesses:
Frank Pardon,
C. P. Dawson.
Inventor
Joseph Norton Sen.
by J. G. Hewitt
Attorney

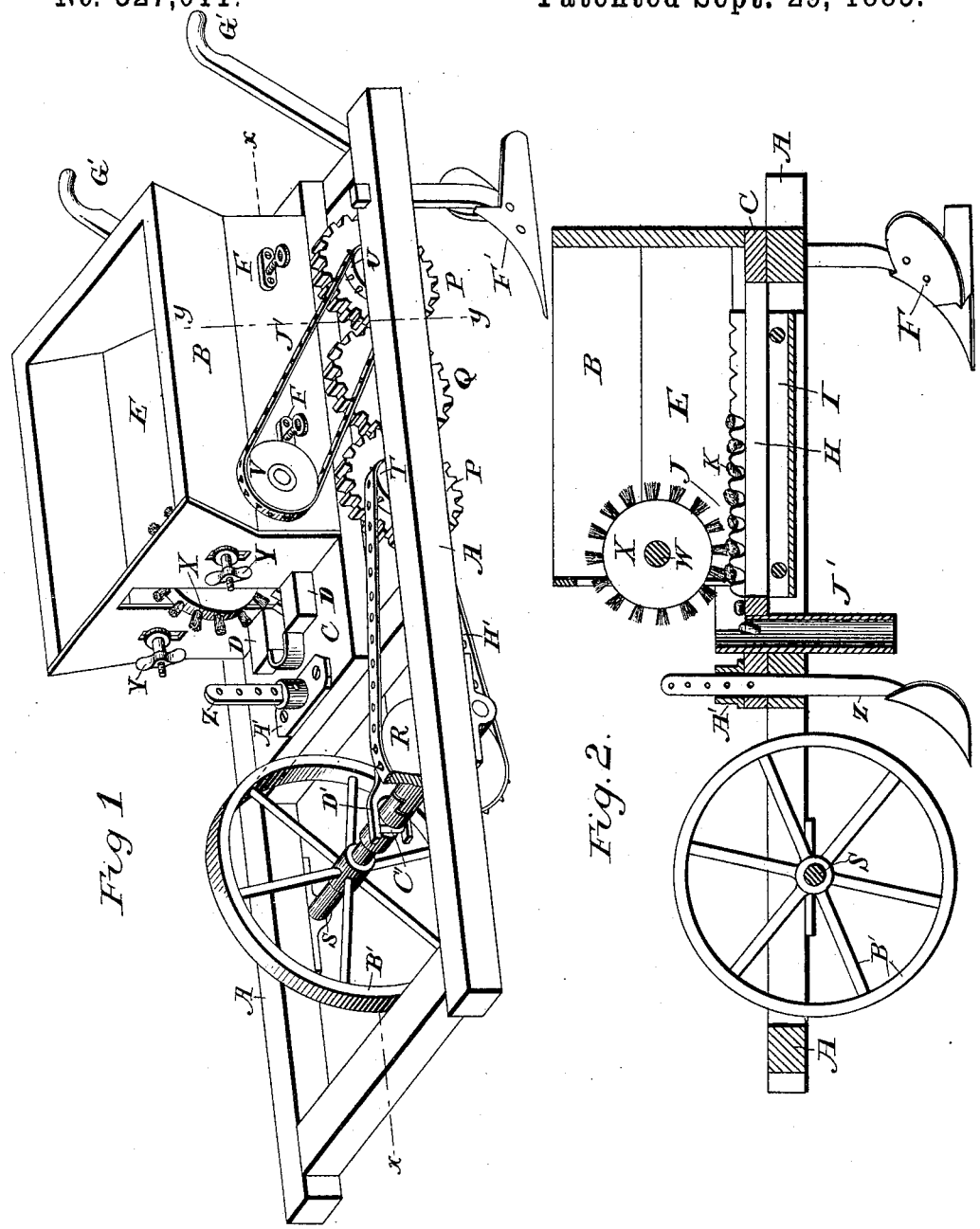

UNITED STATES PATENT OFFICE.

JOSEPHUS NORTON, SR., NEW ALBANY, INDIANA.

POTATO-PLANTER.

SPECIFICATION forming part of Letters Patent No. 327,011, dated September 29, 1885.

Application filed July 14, 1885. (No model.)

*To all whom it may concern:*

Be it known that I, JOSEPHUS NORTON, Sr., a citizen of the United States, residing at New Albany, in the county of Floyd and State of Indiana, have invented a certain new and useful Improvement in Potato-Planters; and I do hereby declare that the following is a full, clear, and exact description of the construction and operation of the same, reference being had to the annexed specification.

This my invention relates to certain new and useful improvements in potato-planters, in which the interior mechanism is operated by its own traction, having a trough-formed box or hopper on the top, into which the potatoes are placed, with a parallel opening in the bottom sufficiently wide to receive a single potato loosely, with a rib in the center to hold them up, and a toothed rack working in the opening at the sides of the rib, having teeth in the upper edges wide enough apart and deep enough to receive a potato loosely, with one in front carried forward by the motion of the racks until it drops into the discharge-pipe and into the row below, while at the same time the racks are lowered by means of the crank-motion, leaving the potatoes to rest upon the rib until, in rising again, they catch the row one potato in the rear of the last each time, and thereby keep one in front ready to be precipitated into the discharge-pipe, and so on in like manner throughout the process of planting.

The object of this my invention is to provide a machine for planting potatoes the interior mechanism of which is operated by its own traction, and thereby gives greater accuracy in planting and renders it more expeditious in its operation and less liable to get out of order. I attain the above object by the mechanism illustrated in the drawings, in which—

Figure 1 is a perspective view of the machine, showing its general construction. Fig. 2 is a sectional view of the machine, taken on the line X X, of Fig. 1, showing the interior mechanism which operates the dropping devices. Fig. 3 is a cross-section of the machine, taken as indicated by Y Y, showing the hopper and rib in the opening and toothed racks at the side. Fig. 4 is a perspective view of the under side of the machine with the gearing left out, showing the lever and other devices for operating the clutch-coupling in stopping and starting, and also the cranks for operating the racks. Fig. 5 is a perspective view of a driving-chain in another form, which may be used if found to answer a better purpose. Fig. 6 is a perspective view of the toothed racks, showing the flat bar between them.

Similar letters refer to similar parts throughout the several views.

In the drawings, A A represent the frame of the machine, and B is the hopper, all of which are made of wood and in form as shown, with the hopper B secured to a thick base-board, c, which rests upon the frame A; and D D are adjustable bars forming the throat of the hopper, with flaring pieces E secured to the top to correspond with the inside flare of the hopper, with set-screws F F in the outside for adjusting the throat to suit the different size potatoes. H is a bar in the opening of the base-block C of the hopper-bottom, for holding up the potatoes in position to be caught by the toothed racks I I in their upward and forward movement, and forced, one at a time, into the discharge-pipe J' below. These racks I are made of sheet metal, of suitable length and thickness, bent in the form of a U, with sufficient space between the parts to pass loosely over the bar H in the opening of the throat in which they work, and are each provided with teeth J in the upper edges for about half their length, and are made wide enough apart to receive a single potato, K, loosely between them, with one in front, and are each operated by means of the cranks L L on the end of the shafts N N, which are journaled in bearings O O on the underside of the frame A; and P P are the gearing-wheels by which they are operated, and Q is an idler between them for transmitting motion.

R is the main driving or sprocket gear-wheel on the front axle S, which is journaled in the frame A in front, and by means of which power is transmitted to operate the wheel T, which further operates the wheels P, Q, and P, and also the wheel U, which gives motion to the wheel V on the end of spindle W, for operating the brush-wheel X in the end of the hopper, which, in connection with the other gear-wheels, are all operated by power transmitted by means of an endless chain or belt, H' and J', which may be constructed in any suitable form.

Y Y are thumb-screws for adjusting the brush-wheel X, which is made in form as shown. Z Z are the plows for opening the rows, which are made adjustable by means of a pin above the box A', and is formed as shown.

B' is the traction-wheel upon which the machine rests and by means of which the several devices are operated.

C' is a sliding clutch-coupling on the shaft S, for stopping and starting the machine, and D' is the lever by which it is operated, which lever is made in form as shown.

E' is the match for the clutch-coupling, secured permanently on the shaft S, and F' F' are plows for covering potatoes, and are made in form as shown, and so arranged as to be adjustable in the frame.

G' G' are the handles for guiding the machine.

In order that others skilled in the art may understand its operation, after the machine is arranged it is only necessary to place the potatoes in the box or hopper B and put the machine in motion, and by means of the traction caused by the wheel B' the several devices are put in motion and the operation of planting begins and continues with accuracy and regularity. Therefore,

What I claim as my invention, and desire to secure by Letters Patent in potato-planters, is—

In a potato-planter, the adjustable trough-formed hopper B, having adjustable sides and bars D D, which form the throat of the hopper for adjusting the width of the opening, as above described, in combination with the center rib, H, adjusting-screws F F, toothed racks I I, and brush-wheel X, substantially as herein described, and for the purpose set forth.

JOSEPHUS NORTON, SR.

Witnesses:
FRANK BARON,
GEORGE HAMMER.